United States Patent [19]
Morrow

[11] 3,949,774
[45] Apr. 13, 1976

[54] VALVE

[75] Inventor: David Morrow, Scottsdale, Ariz.

[73] Assignee: The Garrett Corporation, Los Angeles, Calif.

[22] Filed: Feb. 20, 1975

[21] Appl. No.: 551,471

Related U.S. Application Data

[62] Division of Ser. No. 396,044, Sept. 10, 1973, abandoned.

[52] U.S. Cl. .................. 137/1; 137/119; 137/610; 60/229
[51] Int. Cl.² ...................... F16K 11/16; F02K 1/00
[58] Field of Search .......... 60/229; 137/1, 119, 609, 137/610, 611, 612, 614.11, 627, 832

[56] References Cited
UNITED STATES PATENTS

| | | | |
|---|---|---|---|
| 3,313,500 | 4/1967 | Schmitt | 60/229 X |
| 3,486,517 | 12/1969 | Gaura | 137/610 X |
| 3,860,031 | 1/1975 | Grilli | 137/610 |
| R27,712 | 7/1973 | Becker et al | 137/832 X |

*Primary Examiner*—Alan Cohan
*Assistant Examiner*—Gerald A. Michalsky
*Attorney, Agent, or Firm*—Jack D. Puffer; Albert J. Miller

[57] ABSTRACT

A valve for directing fluid under pressure in which a diverter vane when actuated causes the incoming fluid to move a sealing ball member from a first to a second position for opening or closing said valve.

10 Claims, 7 Drawing Figures

VALVE

This is a division of application Ser. No. 396,044 filed Sept. 10, 1973 now abandoned.

BACKGROUND OF THE INVENTION

This invention relates to valves generally and more particularly to a valve for diverting fluid flow from a first passage to a second passage. In the prior art valves, fluid flow is often controlled by a diverter vane which is used to selectively seal one passage while opening the other. In these devices, the forces required to switch the diverter from a first to a second position were relatively high since the entire pressure differential between the open and closed passages had to be overcome by a diverter actuator. Additionally, the diverter vane was relied upon for the total sealing of the passage, thus, if a tight seal was required the dimensions of the vane and its mating surface on the passage wall had to be closely controlled in order to insure a proper seal.

In another type of prior art diverting valve, a ball sealing member is used to close one passage and open another. This valve suffers many other of the same deficiencies as the diverter valve described above. High actuator forces were required to move the ball from one passage to the other, since the total differential pressure between the passages had to be overcome by the actuator.

Additionally, in the case of a diverter valve where hot corrosive gases are to be controlled, erosion of the diverter vane can cause excessive leak rates after a given period of use. Thus in hot gas applications the valve life was severely restricted.

The present invention overcomes these disadvantages by combining a diverter valve with a ball valve and utilizing the diverter vane to cause the high pressure of the incoming fluid to move a sealing ball from a first port to a second port. Since the diverter vane actuator must overcome only a small portion of the total inlet pressure, smaller actuating forces are required. Additionally, when the valve diverter is at rest the pressure is substantially equal across its surface thus no force is required to maintain it in a static position. In fact the small pressure differential across the vane acts to maintain it in the closed position. As the diverter is not used for sealing the passage, close dimensional control is not required and erosion of the diverter has little or no effect on the operation of the valve. Thus it can be seen that there is provided herein a valve combining the desirable features of diverter valves and ball valves in a simple device having a long useful life and requiring minimum actuator power.

SUMMARY OF THE INVENTION

The valve of the instant invention provides an inlet passage for receipt of high pressure fluid to be controlled. Downstream of this inlet there are provided two opposing ports for exhausting the fluid. A diverter vane is located in the inlet port for diverting the incoming fluid toward one or the other of the outlet ports. An actuator is attached to the diverter vane for moving it from a first to a second position. Intermediate the two outlet ports and downstream of the diverter vane there is provided at least one spherical ball member adapted to selectively seal one or the other of the outlet ports.

When the diverter vane is in one position the incoming fluid is directed toward one side of the inlet opening and forces the ball member against the seat of one port while at the same time opening the other outlet port. Thus the ball may be made to shuttle back and forth between the two outlet ports in response to the position of the diverter vane in the inlet port. When the diverter vane is in the actuated position the pressure is substantially equalized on both sides thereof, thus no additional force is required to maintain the vane in the desired position. Additionally, the full force of the high pressure incoming fluid is thus utilized to cause the ball to seal the outlet opening from which no flow is desired.

Thus it can be seen that with only two moving parts the valve can be made to effectively seal one or the other of the outlet openings by selectively directing the flow in the inlet channel. The sealing is done by the spherical ball member rather than by the diverter, thus the diverter need not be assembled with close clearance to the inlet channel wall as would be the case in prior art diverter valves. The spherical ball and its corresponding ball seats are relatively simple shapes to accurately machine, thus reducing the overall cost of the manufacture of the valve. The concept may be extended to provide a center-off position for closing both outlets simultaneously selectively opening one or the other of the outlets where such function is required. In this second embodiment, the operating principle remains the same. There are provided, however, two sealing balls such that when the diverter vane is in the neutral or center position in the inlet channel, both of the outlets are sealed by their respective ball members. When the diverter vane is switched to one side or the other of the inlet channel, the ball opposite that side is driven away from its seat by the fluid pressure in the same manner as described in connection with the embodiment above.

DESCRIPTION OF THE INVENTION

Figure 1:
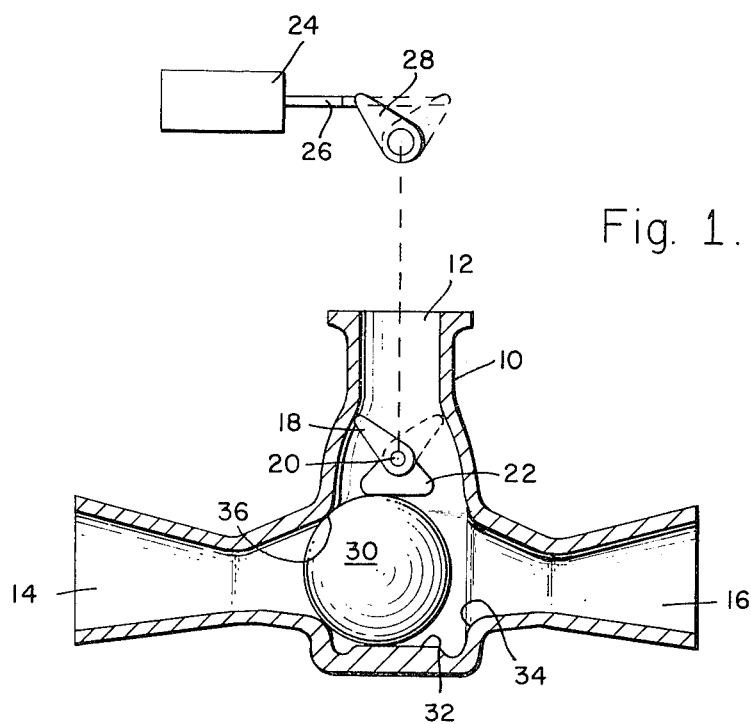
FIG. 1 is a sectional view of one embodiment of the valve.

Referring now to FIG. 1, there is shown one embodiment of the valve of this invention. This valve is a type used for attitude control of missiles. Control is achieved by selectively causing hot gases to exhaust through one or the other of the thruster nozzles on the exhaust parts of the valve.

The valve consists of a body member 10 and having a fluid inlet opening 12 and opposed exhaust nozzles 14 and 16. In the inlet opening 12 there is provided a diverter vane 18 mounted on the shaft member 20. The shaft is mounted in the shaft support member 22 which is integral with body member 10. Connected to the shaft member 20 is an actuator 24 which is connected by shaft 26 to a crank 28. The crank 28 is attached to shaft 20 for moving the diverter vane.

Downstream from the shaft support member 22 there is provided a single spherical ball member 30 intermediate the two exhaust nozzles. The ball is free to traverse between ball seats 34 and 36 along a cylindrical land member 32. In operation the thruster fluid from a source not shown, is directed to the inlet 12 and, depending upon the position of the diverter vane, will be directed out one or the other of the exhaust nozzles. In the position shown in FIG. 1, gas will flow around the diverter and exit through exhaust nozzle 16. The pressure of the incoming gas, because of the position of the diverter vane, forces ball member 30 against ball seat 36 thus sealing off the thruster nozzle 14. As can be seen, the pressures on the opposite surfaces of the diverter vane 18 are substantially equal, thus no force is required from the actuator to maintain the diverter in its desired position.

When thrust in the opposite direction is required, actuator 24 is energized to move the diverter vane 18 from the position shown in solid line to that shown by dotted lines. Because the pressure on opposite sides of the diverter vane is substantially the same, positive force is required from the actuator in only the first ten degrees of the full thirty degree travel of the diverter. After ten degrees of movement the pressure of the incoming gas aids in moving the diverter vane to the opposite side of the inlet channel. As the diverter vane nears the opposite wall of the inlet channel, there is created a momentary high pressure differential across the ball. The side of the ball adjacent seat 34 is exposed to ambient pressure through nozzle 16 while the opposite side of the ball is subject to the full pressure of the incoming gas. The total area of the ball between the ball seat 36 and the cylindrical land 32 is selected to be substantially larger than the area of the ball seat 36. This differential pressure area causes the incoming fluid to generate a positive force to move the ball to the opposite seat. Since nozzle closure is accomplished by the spherical ball member acting against its seat, it is not required that the diverter vane 18 provide a sealing engagement against the inside surface of the conduit 12 as it is the case in prior art diverter valves. The diverter vane is used only to direct the flow of gases to cause the ball to seal against the desired ball seat. The high pressure of the incoming gas is used to move the ball and to aid in moving the diverter after the initial motion has been accomplished by the actuator.

Figure 3:
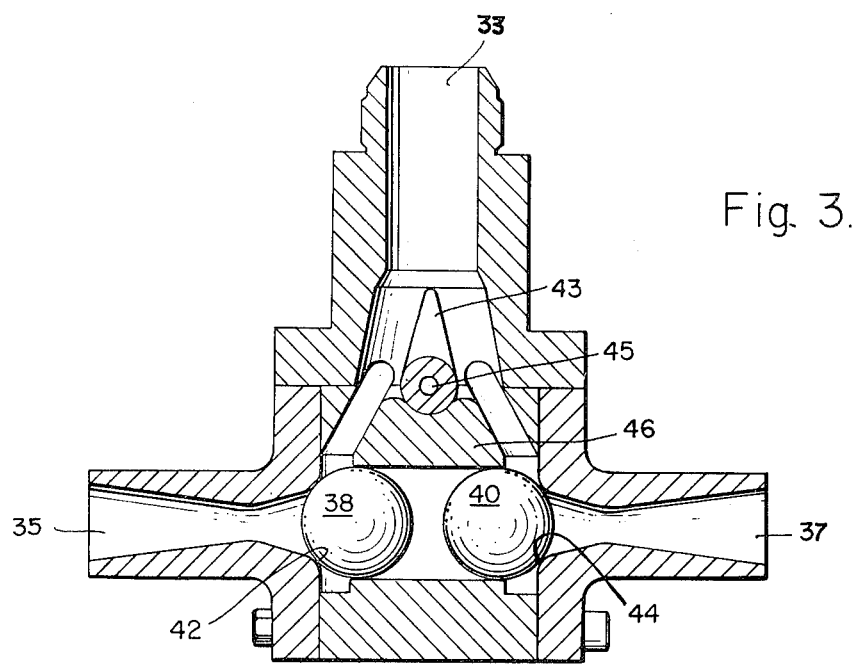
FIG. 3 is a sectional view taken along line 3—3 of FIG. 2.
Figure 2:
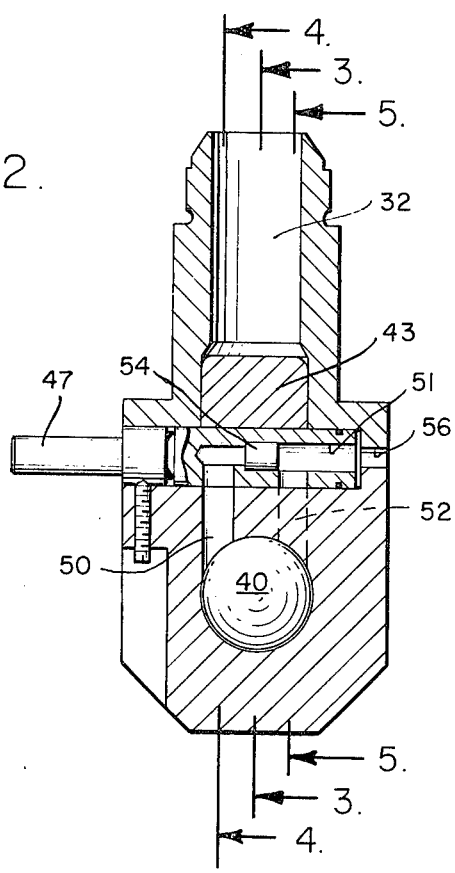
FIG. 2 is a sectional view of another embodiment of the valve.

Referring now to FIGS. 2 and 3, there is shown an alternate embodiment of the invention. This embodiment provides the same function as that described in connection with FIG. 1 above, that is selectively opening one thruster nozzle while closing the other one. In addition, this valve has a center-off position in which both nozzles are kept closed when no thrust is required. This valve is similar to that shown in connection with FIG. 1 in that there is provided an inlet opening 33 and opposed thruster nozzle outlets 35 and 37 selectively closable by balls 38 and 40, which are seated in their respective ball seats 42 and 44. The diverter vane 43 is mounted on a shaft 47 supported by shaft support member 41. An actuator (not shown) of any desired type may be connected at shaft 44 for controlling the position of the diverter vane.

The operation of this valve is similar to that described in connection with the embodiment of FIG. 1 above, except for the provision of the center-off position in which a ball is sealed against each of the ball seats for closing both nozzles simultaneously. The operation of this valve is best seen by reference to FIGS. 4 and 4a and 5 and 5a. FIGS. 4 and 5 show the diverter vane in the neutral position for maintaining both nozzles closed. In this position the incoming gases flow through the inlet 33 around both sides of the diverter vane 43 and into opposed openings 48 in the sides of the diverter vane. This gas then flows through the diverter vane through an opening in the shaft 47 and through channel 50 in the shaft support member. This opening 50 introduces the high pressure gas between the balls 38 and 40 thus forcing them against their respective ball seats and closing both thruster nozzles. Behind the first set of openings 48 in the diverter vane there is formed an opening 51 extending part way through the center of shaft 47. This opening 51 connects with a pair of channels 52 which extend through the shaft support member 41 and communicate with the space between two balls 38 and 40. With the diverter vane in the neutral position, as shown in FIG. 5, these channels 52 are not connected with the opening 51.

Figure 4A:
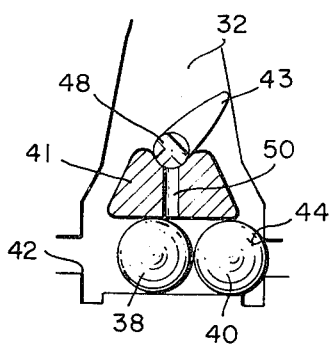
FIG. 4a is a sectional view taken along line 4—4 of FIG. 2 with the diverter vane in the actuated position.
Figure 4:
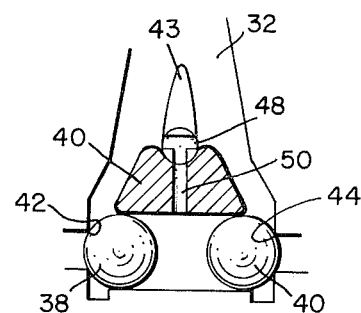
FIG. 4 is a sectional view taken along line 4—4 of FIG. 2.
Figure 5A:
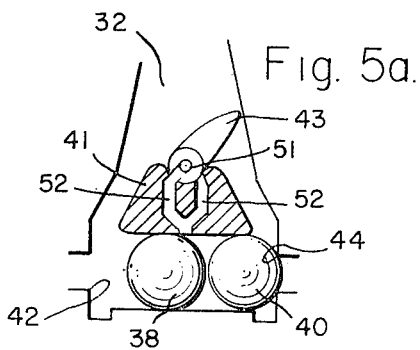
FIG. 5a is a partial sectional view taken along line 5—5 of FIG. 2 with the diverter vane in the actuated position.
Figure 5:
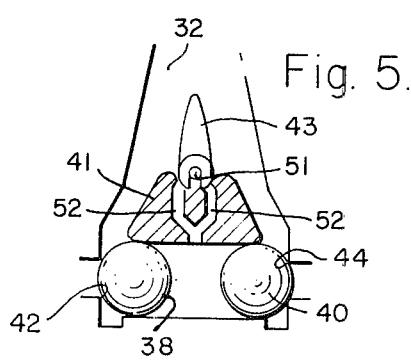
FIG. 5 is a partial sectional view taken along line 5—5 of FIG. 2.

When it is desired to open one of the thruster nozzles, for example, nozzle 35, the diverter vane is moved to the position shown in FIGS. 4a and 5a. When the diverter is moved, as shown, the communication between the inlet passage 33 and the opening 50 is closed and the hot gas can no longer enter the chamber between the balls 38 and 40. The full flow of hot gas is diverted through channel 41 and acts upon ball 38 to move it from the ball seat 42 and force it to the opposite side adjacent ball 40.

Referring now to FIG. 5a, it can be seen that when the diverter 43 is in the position illustrated, one of the openings 52 is connected to opening 51 in the shaft 47. As illustrated in FIG. 2, this connection allows the hot gas, which had been supplied to the chamber between the balls, to be exhausted out one of the channels 52 into channel 51 in the shaft and exhausted through opening 56 in the valve to the ambient atmosphere. This venting of the ball chamber generates the pressure differential across the ball required to move it away from its seat in the same manner as described in connection with FIG. 1. There is provided a plug member 54 in the shaft opening to prevent communication between channels 50 and 52.

When the opposite effect is required, that is to open nozzle 37 and close nozzle 35, the diverter vane is rotated to the opposite side and switching is accomplished in the same manner as described above.

Thus it can be seen that there is provided by this invention a valve suitable for use in fluid applications which is constructed with a few, easily produced parts yet providing rapid action, long life and requiring a minimum amount of power for actuation.

While specific embodiments of the invention have been illustrated and described, it is to be understood that these embodiments are provided by way of example only and that the invention is not to be construed as being limited thereto, but only by the proper scope of the following claims.

What I claim is:

1. A fluid control valve comprising:
   a body member having a fluid inlet passage and first and second outlets;
   diverting means in said inlet passage for directing fluid flow toward or away from said outlets;
   means responsive to the position of said diverter means to selectively close and open said outlets upon a change of position of the diverting means; and means for positioning said diverting means in one of three positions in said inlet passage, said first position causing said first outlet to open and said second outlet to close, said second position causing the second outlet to open and said first outlet to close and said third position causing both of said outlets to close.

2. A fluid control valve comprising:

a body member having a fluid inlet passage and first and second outlets;

diverting means in said inlet passage for directing fluid flow toward or away from said outlets;

two ball members responsive to the position of said diverting means, each of said ball members being operatively associated with one of said outlets for closing and opening their respective outlets in response to the position of said diverting means; and means for positioning said diverting means in one of three positions in said inlet passage, said first position causing said first outlet to open and said second outlet to close, said second position causing the second outlet to open and said first outlet to close and said third position causing both of said outlets to close.

3. A fluid control valve comprising:

a body member having a fluid inlet opening and first and second fluid outlet openings;

a fluid diverter vane attached to said body member and positioned in said inlet opening, said diverter vane being movable to at least three positions with respect to said inlet opening, said first position directing incoming fluid to one of said outlet openings, said second position directing inlet fluid to the other of said outlet openings and the third position being a neutral position;

actuator means for positioning said diverter vane;

sealing means operable in response to the position of said diverter vane for selectively opening one or the other of said outlet openings when said diverter vane is in said first or said second position, and for sealing both of said outlet openings when said diverter vane is in the neutral position.

4. A fluid control valve comprising:

a body member having a fluid inlet opening and first and second fluid outlet openings, each of said outlet openings being provided with a ball seat area;

a fluid diverter vane attached to said body member and positioned in said inlet opening, said diverter vane being movable to at least three positions with respect to said inlet opening, said first position directing incoming fluid to one of said outlet openings, said second position directing inlet fluid to the other of said outlet openings and the third position being a neutral position;

actuator means for positioning said diverter vane;

sealing means comprising two spherical ball members positionable in response to the position of said diverter vane for selectively opening one or the other of said outlet openings when said diverter vane is in said first or second position, and for sealing both of said outlet openings when said diverter vane is in the neutral position.

5. A fluid control valve according to claim 4 wherein there is provided a fluid passage between said inlet opening and a chamber between said ball seats, said passage communicating with said inlet passage when the diverter vane is in said third position and in communication with a low pressure source downstream of said inlet when said diverter vane is in said first or second position.

6. A method of controlling fluid flow in a valve means having a fluid inlet opening and first and second outlet openings, said method comprising:

diverting fluid in said inlet opening toward one of said outlet openings and away from the other outlet openings when flow is desired from said one outlet opening;

displacing a first seal member away from said one outlet opening by fluid pressure from said diverted fluid;

displacing by fluid pressure from said diverted fluid a second seal member in sealing engagement with said other outlet opening to prevent fluid flow therefrom; and directing fluid in said inlet opening between said outlet openings for displacing both of said sealing means into sealing engagement with their respective outlet openings when no flow is desired from either outlet opening.

7. A method of controlling fluid flow in a valve means having a fluid inlet opening and first and second outlet openings, and first and second spherical ball seal members for sealing the respective first and second outlets, said method comprising the steps of:

diverting fluid in said inlet opening toward said first outlet opening and away from said second outlet opening when flow is desired from said first outlet opening;

displacing said first seal member away from said first outlet opening by fluid pressure from said diverted fluid;

displacing by fluid pressure from said diverted fluid said second seal member into sealing engagement with said second outlet opening to prevent fluid flow therefrom; and directing fluid in said inlet opening between said outlet openings for displacing both of said sealing members into sealing engagement with their respective outlet openings when no flow is desired from either outlet opening.

8. The method of claim 7, wherein said ball members are contained in a ball chamber between said inlet opening and opposed outlet openings, said fluid being diverted into said chamber between said ball members when no flow is desired from said outlet openings.

9. The method of claim 8, further comprising:

venting said ball chamber downstream of said outlet openings when one of said outlet openings is opened.

10. A fluid control valve comprising:

a body member having a fluid inlet opening and first and second fluid outlet openings;

a fluid diverter vane attached to said body member and positioned in said inlet opening, said diverter vane being movable to at least three positions with respect to said inlet opening, said first position directing incoming fluid to one of said outlet openings, said second position directing inlet fluid to the other of said outlet openings and the third position being a neutral position;

actuator means for statically positioning said diverter vane;

sealing means operable in response to the position of said diverter vane for maintaining one or the other of said outlet openings open to fluid flow while said diverter vane is in said first or second position and for maintaining both of said outlets closed while said diverter vane is positioned in the neutral position.

* * * * *